(12) United States Patent
Marr et al.

(10) Patent No.: US 8,570,675 B1
(45) Date of Patent: Oct. 29, 2013

(54) KINEMATIC OPTICAL DEVICE MOUNT

(75) Inventors: Lyale F. Marr, Richardson, TX (US);
Emmanuel Fierro, Plano, TX (US);
Robert K. Bratton, Mckinney, TX (US);
Kelvin L. Keels, Gunter, TX (US)

(73) Assignee: Raytheon Company, Waltham, MA (US)

( * ) Notice: Subject to any disclaimer, the term of this patent is extended or adjusted under 35 U.S.C. 154(b) by 73 days.

(21) Appl. No.: 13/462,108

(22) Filed: May 2, 2012

(51) Int. Cl.
*G02B 7/02* (2006.01)

(52) U.S. Cl.
USPC .......................................................... 359/822

(58) Field of Classification Search
USPC .......................................... 359/822, 846, 849
See application file for complete search history.

(56) References Cited

U.S. PATENT DOCUMENTS

| 5,505,422 | A | 4/1996 | Elterman |
| 2004/0065793 | A1 | 4/2004 | Shelef |
| 2006/0016061 | A1 | 1/2006 | Shelef |
| 2006/0232837 | A1 | 10/2006 | Shelef |
| 2007/0195441 | A1* | 8/2007 | Aizawa et al. ............... 359/871 |
| 2008/0219756 | A1 | 9/2008 | Grant |

FOREIGN PATENT DOCUMENTS

JP 04-296708 A 10/1992

OTHER PUBLICATIONS

"Whippletree (mechanism)", Wikipedia, the free encyclopedia, [retrieved online].
International Search Report and the Written Opinion of corresponding International Application No. PCT/US2013/026026 mailed Jun. 13, 2013.

* cited by examiner

*Primary Examiner* — Joseph P Martinez
(74) *Attorney, Agent, or Firm* — Renner, Otto, Boisselle & Sklar, LLP

(57) ABSTRACT

An optical mount is used for mounting an optical element, such as a beam splitter or a mirror, to a housing. The optical mount includes a pair of optical element retainer clamps that secure a first side of the optical element at respective first securement points on one of the major surfaces of the optical element, and also engage a first edge. A whiffletree retainer clamp secures a second side of the optical element at a second securement point on the one of its major surfaces. The whiffletree retainer clamp couples a whiffletree retainer to the housing, with the whiffletree retainer engaging a second edge along the second side of the device. The whiffletree retainer is positionally adjustable, for example able to pivot. Pivot pads may be used in at least some of the engagements to secure the optical element. The pivot pads may be segments of ball bearings.

20 Claims, 6 Drawing Sheets

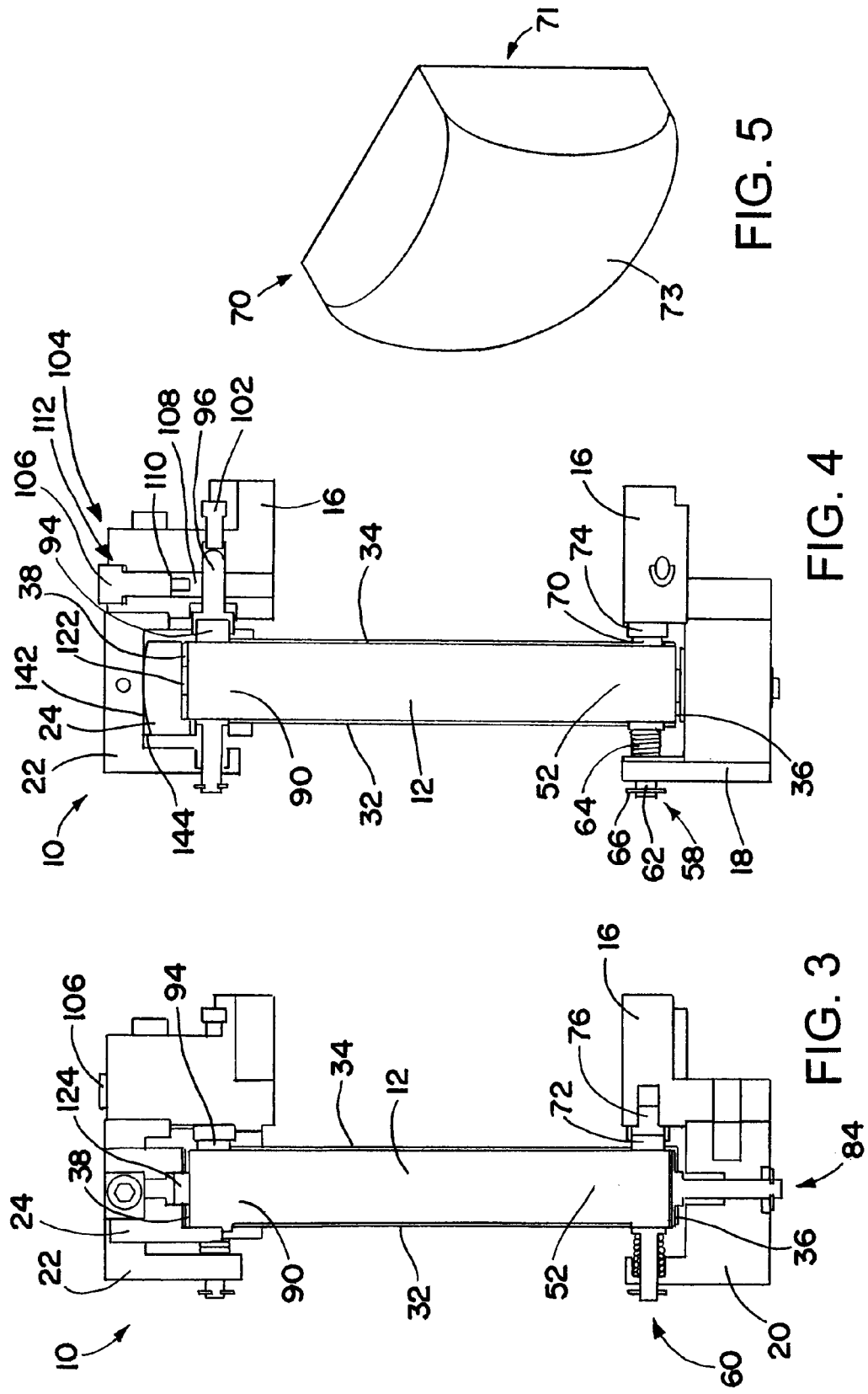

KINEMATIC OPTICAL DEVICE MOUNT

BACKGROUND OF THE INVENTION

1. Field of the Invention

The invention is in the field of mounts for optical elements, and methods for securing and/or adjusting optical elements.

2. Description of the Related Art

Precision optical devices or elements, such as beam splitters or mirrors, may need substantially strain-free optical mounts to provide diffraction-limited optical performance. One typical type of mount capable of achieving these requirements is referred to as kinematic. The theory of kinematic design assumes that the bodies are perfectly rigid, and that contact only occurs at points. Every rigid body possesses six degrees of freedom. These degrees of freedom are translations along three (3) mutually orthogonal axes, and three (3) rotations around these axes. The theory of kinematic design states that a rigid body has (6-n) degrees of freedom, where (n) is the number of contact points. Any mount or support that constrains a rigid object with more than six (6) contact points, is said to "over-constrain" the object, which likely results in distortion and uncertain position of the object. In kinematic design, three (3) points determine a plane, so that contact of a plane surface to more than three (3) points, distorts the plane surface to the co-planarity of all points contacting the plane surface. This co-planarity requirement for the mating surface must then be equal to the optical tolerance for flatness of the plane surface, which typically is a fraction of the wavelength of light. Such a requirement for mechanical surfaces, designed to mate with optically flat surfaces, imposes significant design and fabrication challenges.

Current mounts use angularly adjustable frames that house rectangular optic devices which are potted with room temperature vulcanization (RTV) silicone, or some other suitable adhesive. These adhesives are liquid when applied and thus conform to the optic's surface, but typically induce some strain into the optic when cured to their final state as a more rigid compound. The coefficient of thermal expansion of these RTV compounds does not equal those of the optic or the metals, such as aluminum, typically used to fabricate optical mounts. To ensure strain-free mounting of potted optics, over temperature changes, the gap used for the potting must be athermalized, i.e., made to function as though it is unchanging, independent of temperature. This means that the gap is sized such that ideally, no stress results from expansion differences between the mount, the RTV or other potting compound, and the optic being mounted. Since materials expand in all three dimensions simultaneously, designing perfectly athermal potting gaps can be challenging. For non-circular optics, such as in rectangular shapes, this more complex geometry results in athermalized gap designs that are typically impractical to fabricate, due to the requirement for continually varying cross-sections. RTV and other optics bonding adhesives generally used, typically possess a low bulk modulus of elasticity to minimize forces on the optic resulting from non-athermalized gaps. The more non-circular the optic, the greater the temperature changes relative to the bonding temperature, the more sensitive the optic to strain, etc., all underscore the importance of a perfectly athermalized potting gap. Strain induced by temperature changes on non-athermalized gaps can both deform the optic, and tilt it relative to surfaces of the frame to which it is potted. As an option, some frames may use flexures for mounting the optic within the frame. The flexure, or any surfaces or materials contacting the optic, which over-constrain it, can create localized stresses at the points of contact with the optic. This can result in degraded optical characteristics, such as degraded surface figure, with its resulting degradation on optical wavefronts interacting with strained optical surfaces. Minimizing strain in optics can also be challenging, particularly in extreme environmental conditions, such as involving temperature extremes, vibrations, and/or shocks. It would be desirable to have improved optical mounts that would avoid or alleviate these shortcomings.

SUMMARY OF THE INVENTION

According to an aspect of the invention, an optical element mount includes pivot pads that allow an optical element, held by the mount, to be adjusted in one or two axes. The pivot pads facilitate tilting the optical element without inducing over-constraints, i.e., bending moments. The pivot pads may be portions of commercially available ball bearings, which are inexpensive, made to tight tolerances, and can be fabricated by processes, like electrical discharge machining (EDM), to be substantially burr free.

According to another aspect of the invention, an optical mount includes two retainer clamps that engage a first side of a major surface of an optical element held by the mount, and one retainer clamp that engages a second side of the major surface. The retainer clamp that engages the second side of the major surface also is mechanically connected to a whiffletree retainer that engages one or more edges of the optical element. The whiffletree retainer is able to pivot, along with the optical element, relative to the retainer clamps and a housing of the optical mount.

According to yet another aspect of the invention, an optical mount includes: a housing; a pair of optical element retainer clamps mechanically coupled to the housing, wherein the optical element retainer clamps are configured to receive and secure a first side of an optical element at respective first securement points on a major surface of the optical element, adjacent to a first edge of the optical element that is along the first side; a whiffletree retainer clamp mechanically coupled to the housing, wherein the optical element retainer clamps are configured to receive and secure a second side of an optical element at a pair of second securement points on the major surface; and a whiffletree retainer that is configured to press against at least two points along a second edge of the optical element that is along the second side. The whiffletree retainer clamp mechanically couples the whiffletree retainer to the housing. The whiffletree retainer is positionally adjustable relative to the optical element retainer clamps and the whiffletree retainer clamp.

In accordance with a further aspect of the invention, a method of securing an optical element includes: placing the optical element in a whiffletree retainer of an optical mount; and securing the optical element in three places, by use of pads of the mount pressing on opposite major surfaces of the optical element.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

FIG. 3 is a first side sectional view of the optical mount of FIG. 1, showing the mount holding an optical element.

FIG. 4 is a second side sectional view of the optical mount of FIG. 1, showing the mount holding an optical element.

FIG. 5 is an oblique view showing a pivot pad used in the optical mount of FIG. 1.

DETAILED DESCRIPTION

Figure 1:
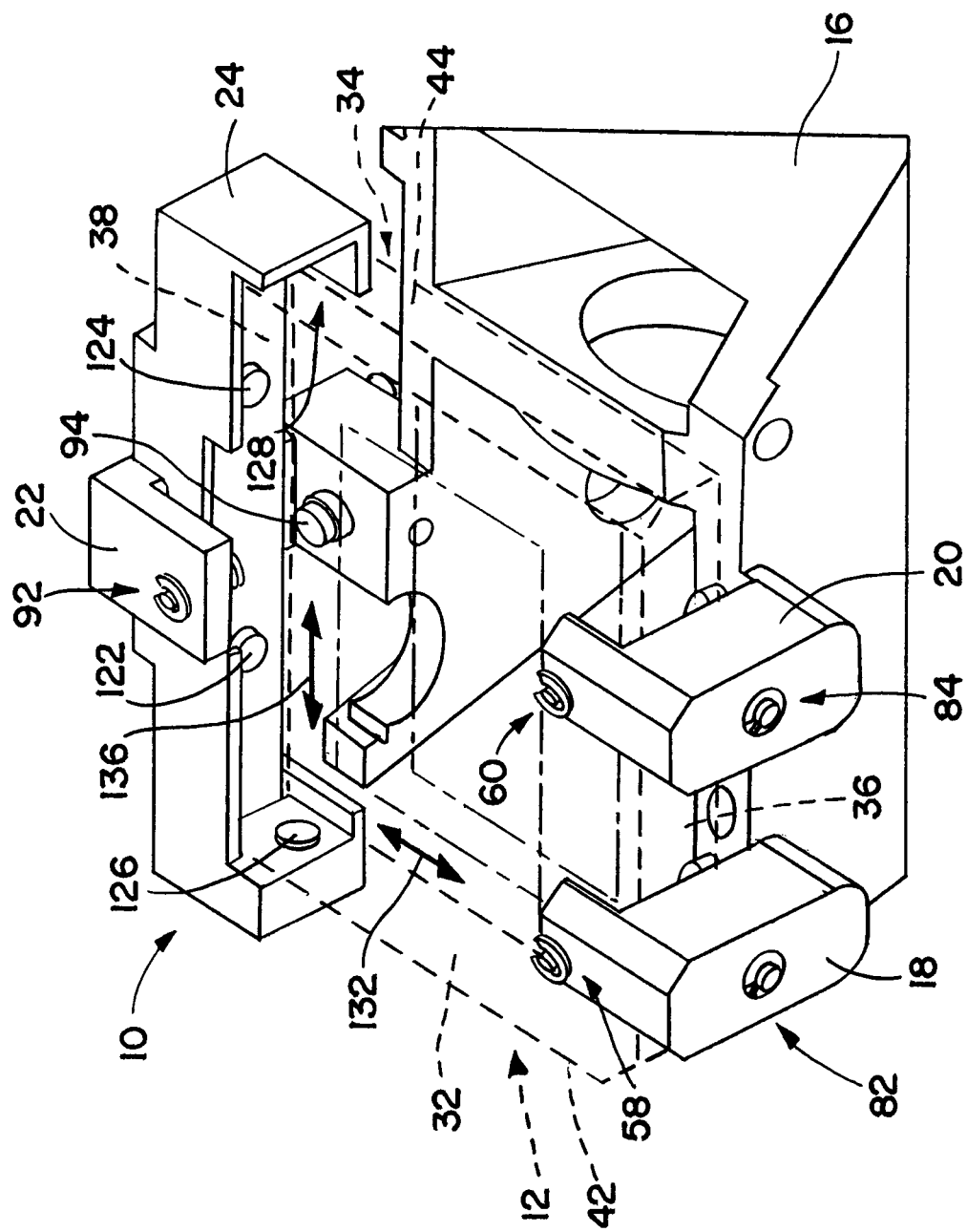
FIG. 1 is an oblique view of an optical mount according to an embodiment of the invention.

An optical mount is used for mounting an optical element, such as a beam splitter or a mirror, to a housing. The optical element may have a rectangular shape, with opposed major surfaces, such as top and bottom major surfaces, and with side edges running from one major surface to the other. The optical mount includes a pair of optical element retainer clamps that secure a first side of the optical element at respective first securement points on one of the major surfaces of the optical element, and that also engage a first edge of the optical element. A whiffletree retainer clamp secures a second side of the optical element at a second securement point on the one of the major surfaces. The whiffletree retainer clamp couples a whiffletree retainer to the housing, with the whiffletree retainer engaging a second edge of the optical element that is along the second side of the device. The whiffletree retainer is positionally adjustable relative to the optical element retainer clamps and/or the whiffletree retainer clamp, for example being able to pivot relative to either or both. Pivot pads may be used in at least some of the engagements to secure the optical element. The pivot pads may have a flat engagement surface that engages one of the optical element major surfaces, and a curved surface that enables pivoting. The pivot pads may be segments of ball bearings, for example cut using an electro-discharge machining process. The optical mount allows for firm securing of the optical element, but without placement of bending moments on the optical element that could result in stresses that could distort or damage the optical element. By using the whiffletree in securing the optical element, over-constraint of the optical element may be avoided. Suitable adjustment mechanisms and locking mechanisms may be used as part of the optical mount.

Referring to FIGS. 1-4, an optical mount 10 is used for securing an optical element 12. The optical mount 10 includes a housing 16, a pair of optical element retainer clamps 18 and 20, a whiffletree retainer clamp 22, and a whiffletree retainer 24. The retainer clamps 18-22 together secure the optical element 12 by pressing against three securement points on each of opposed major surfaces 32 and 34 of the optical element 12, without overconstraining the optical element 12. The optical element retainer clamps 18 and 20, and the whiffletree retainer clamp 24, also secure opposite first and second edges 36 and 38 of the optical element 12, with the whiffletree retainer 24 securing opposite third and fourth edges 42 and 44 of the optical element 12 as well. The whiffletree retainer 24 is secured to the housing by the whiffletree retainer clamp 22, with the whiffletree retainer 24 able to adjust its position relative to the optical element retainer clamps 18 and 20, and/or relative to the whiffletree retainer clamp 22. For instance the whiffletree retainer 24 may pivot relative to the optical element clamps 18 and 20, firmly securing the optical element 12 while avoiding bending and other stresses that may be introduced by overconstraint of the optical element 12.

The optical element 12 may be a beam splitter, mirror, lens, or other sort of optical element. Such optical elements may be easily damaged, or otherwise vulnerable to bending stresses, such as by being distorted and thereby having their usefulness impaired. The optical element 12 may be made of optical glass or another suitable material.

The optical element retainer clamps 18 and 20 secure a first side (side portion or side part) 52 of the optical element 12. The retainer clamps 18 and 20 have respective flat pads 58 and 60 that engage and press against first securement points on the first surface 32 of the optical element 12. The flat pad 58 includes a plunger 62, a compression spring 64, and a snap ring 66. The flat pad 60, as well as other flat pads of the optical element mount 10, include similar parts. The springs of the pads 58 and 60 provide a preloading force against the first surface 32. The optical element first side 52 is clamped between the flat pads 58 and 60, which engage the first surface 32, and pivot pads 70 and 72, which press against securement points on the second major surface 34 of the optical element 12. Pads 58 and 60 are coaxial with pivot pads 70 and 72, respectively, to prevent the generation of bending moments in this plane of support of the optical element 12. The pivot pads 70 and 72 have flat front surfaces that engage the second major surface 34, and curved back surfaces, such as spherical back surfaces. FIG. 5 shows the pivot pad 70, with its flat front surface 71 hidden in the illustration, and its curved back surface 73. The curved back surfaces are located in cup-shape pivot pad supports 74 and 76 that are secured to the housing 16. The pivot pad supports 74 and 76 may be either captured by, or threaded into, the holes in the housing 16. The springs contacting the pads 58 and 60 provide the force that holds the flat surfaces of the pads 58 and 60, and of the pivot pads 70 and 72, against the surfaces 32 and 34 of the optical element 12. The curved back surfaces of the pivot pads 70 and 72 allow the optical element 12 to pivot through angles of several degrees, for example, relative to most of the parts of the optical mount 10 (the housing 16 and the clamps 18-22), while still being held between the housing 16 and the clamps 18-22 and without over-constraining the optical element, regardless of its angular position.

The optical element retainer clamps 18 and 20 also have respective flat pads 82 and 84 for engaging the first edge 36 of the optical element 12. The pads 82 and 84 have a configuration similar to that of the flat pads 58 and 60, having respective spring-loaded plungers that provide a spring force for pushing against the first edge 36, and snap rings for keeping the plungers and the springs coupled to the retainer clamps during assembly.

A second side (side portion or side part) 90 of the optical element 12 is gripped between the whiffletree retainer clamp 22 and the housing 16. The whiffletree retainer clamp 22 includes a flat pad 92, similar to pads 58, 60, 82 and 84, that presses against a second securement point on the first optical element major surface 32. From the other side, the major surface 34, an adjustable pivot pad 94 holds the optical element 12 in place. The adjustable pivot pad 94 may be similar to the pivot pads 70 and 72 described above, having a flat front surface that is against the second major surface 34, and a curved back surface that rests in a cup-shape pivot pad support 96. The position of the pivot pad support 96 may be adjusted by use of an adjustment screw 102. Turning the adjustment screw 102 adjusts the height of the pivot pad support 96 above (from) the housing 16, and thus also the heights above the housing 16 of the pivot pad 94 and the second side 92 of the optical element 12 (which change height together). A lock 104 may be used to lock the position of the pivot pad support 96 in place. The lock 104 includes a locking screw 106 and a locking pin 108, with a spring 110 between the two. Threading the locking screw 106 into the corresponding threaded hole 112 in the housing 16 presses the locking pin 108 inward against the pivot pad support 96, locking the pivot pad support 96 in place to prevent movement of the pivot pad support relative to the housing 16.

The whiffletree retainer 24 also aids in kinematically supporting the second side portion 90 of the optical element 12. Instead of engaging the major surfaces 32 and 34 of the optical element 12, the whiffletree retainer 24 engages the edges 38, 42, and 44 of the optical element 12. The whiffletree retainer 24 has four pads 122, 124, 126, and 128. The pads 122 and 124 are pivot pads, having the same general configuration as is described above with regard to the pivot pads 70 and 72. The pads 122 and 124 are coaxial with pads 82 and 84 to prevent bending moments in this second support plane across the optical element 12. The pad 126 is a flat pad that may have the same general configuration as is described above with regard to other flat pads of the optical mount 10, such as the flat pads 58 and 60. Similarly, pad 128 is coaxial with pad 126 to prevent bending moments in this third support plane across the optical element 12. Since there is only a single point of contact with pad 128 on edge 44 of the optical element 12, the criticality of the contour of this pad is diminished as compared to the other pads. For this reason, pad 128 may be a pivot pad like pads 70 and 72, or it may be a spherical or cylindrical surface machined integral into the whiffletree retainer 24. Thus, the flat pads 122 and 124 engage (press against) the second edge 38, the flat pad 126 engages the third edge 42, and pad 128 engages the fourth edge 44. The pads 122 and 124 work in combination with the pads 82 and 84 on the optical element retainer clamps 18 and 20 to hold the optical element 12 in a first direction 132 that is substantially parallel to the major surfaces 32 and 34 (and substantially perpendicular to a height or distance from the housing 16). The pads 126 and 128 hold the optical element 12 in a second direction 136 that is substantially parallel to the major surfaces 32 and 34, and is perpendicular to the first direction 132.

The whiffletree retainer 24 has a pivot radius on an end surface 142 that butts up against an inner surface 144 of the whiffletree retainer clamp 22. The pivot radius is configured to allow the whiffletree retainer 24 and the optical element 12 to pivot as the position of the adjustable pivot pad 94 is adjusted by use of the adjustment screw 102. The pivot radius thus may be selected for pivoting of the whiffletree retainer 24 and the optical element 12 about the pivot pads 70 and 72.

Figure 2:
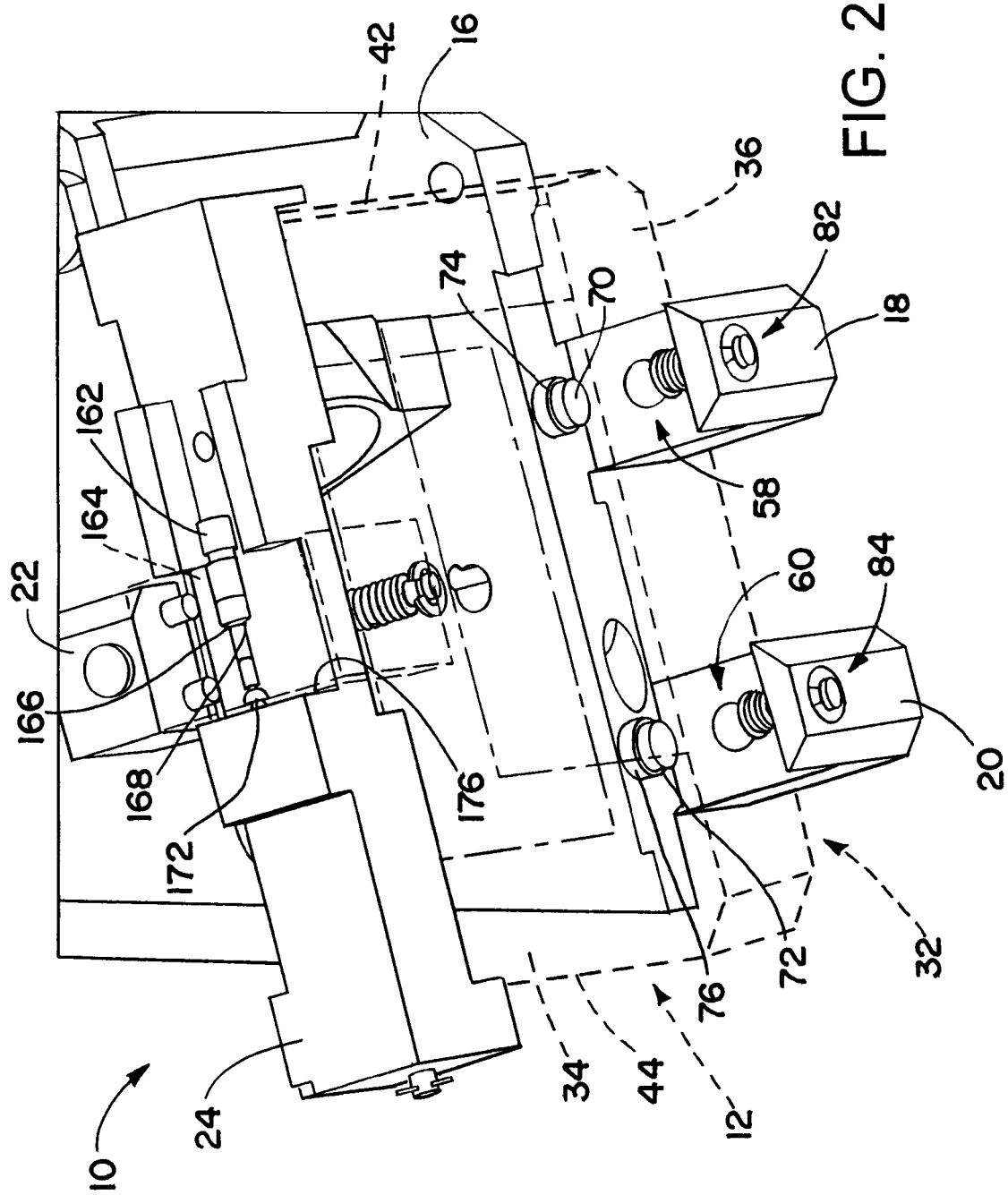
FIG. 2 is another oblique view of the optical mount of FIG. 1, showing the optical mount from a different angle.

Referring to FIG. 2, the whiffletree retainer 24 is secured to the whiffletree retainer clamp 22 by a whiffletree retainer lock screw 162. The lock screw or bolt 162 is threaded into a corresponding hole 164 in the whiffletree retainer clamp 22. A spring 166 is located in the hole 164, on a ledge 168 within the hole 164. The lock screw 162 can be threaded into the hole 164 against the spring force of the spring 166. The tip of the lock screw 162 presses a lock ball 172 against a surface 176 of the whiffletree retainer 24, which locks the whiffletree retainer 24 in place, relative to the whiffletree retainer clamp 22, against unwanted movement in the second direction 136. The lock ball 172 is used, rather than directly engaging the surface 176 with the tip of the lock screw 162, in order to avoid transmitting a moment to the whiffletree retainer 24 that might distort the whiffletree retainer 24 and/or the optical element 12.

The optical mount 10 advantageously allows the securing of the optical element 12 with a minimum of strain on the device 12. Precision optical elements may require low levels of stress and strain in order to provide good, diffraction-limited optical performance. Flat optical elements such as the optical element 12 may need to be supported in a planar fashion to a high degree of accuracy, for example requiring support-point coplanarity on the order of a fraction of an optical wavelength, such as approximately 0.0762-0.3048 micrometers (3-12 microinches). The optical mount 10 provides virtually strain-free planar support of the optical element 12, while facilitating controllable tilt of the optical element 12, for angular alignment of the optical element 12.

The optical mount 10 advantageously has only three pairs of coaxial contact points with each of the major surfaces 32 and 34 of the optical element 12. Utilizing only three pairs of points on these major surfaces provides minimum, but adequate, planar support and registration while preventing overconstraint of the optical element 12, which would-introduce stress (and strain) into the optical element 12. The pivoting whiffletree retainer 24, both avoids overconstraint of the optical element 12, and prevents undesired movement of the optical element 12 in all remaining directions, while facilitating adjustment of the angle of the optical element 12 relative to the housing 16. Another key advantage of the whiffletree retainer 24 is that it provides the critical support technique to allow aligning the contact points at pads 122 and 124 to be coaxial to contact pads 60 and 58, respectively. Distributed pairs of coaxial support points provide robust inertial support to the optical element, while preventing bending stresses across the optical element 12.

The use of the whiffletree retainer 24, to provide dual points of support, also minimizes the optical element's contact stresses during high inertial load conditions. The optical mount 10 provides stable support and alignment retention over a large range of environmental conditions, including shock and vibration. In particular, changes in temperature do not introduce significant stresses into the optical element 12. The various spring-loaded pads provide a means by which the optical mount 10 has some "give" that allows for changes in dimensions during thermal changes.

The various parts of the optical mount 10 may be made of any of a variety of suitable materials. Aluminum is a suitable material for the larger parts of the optical mount 10, such as the housing 16, the retainer clamps 18-22, and the whiffletree retainer 24. Parts of the mount 10 may be made of aluminum, steel, or other metallic material suitable for the environment and the opto-mechanical requirements. For example the whiffletree retainer clamp 22 may be made of steel or aluminum. Unlike potted optical assemblies, which require athermalized gaps at all bonding locations to ensure that the adhesives provide strain-free mounting over temperature extremes, the springs loading pads 58, 60, 82, 84, and 126 inherently compensate for the thermal expansion differences between the mount materials and the optic. Unlike certain optical bond joints, the compression-only forces, generated by these six coaxial spring-loaded pairs of pads, do not induce any bending moments in spite of housing and optic dimensional changes with temperature.

Many variations are possible in the configuration of the optical mount 10. For example the flat pads 58, 60, and 92, and the pivot pads 70, 72, and 94, may be reversed. That is, the housing 16 may include the flat pads, and the retainer clamps 18-22 may include pivot pads. Other variations will be appreciated.

As noted earlier, the pivot pads 70, 72, and 94 may be parts of one or more ball bearings. Ball bearings have the advantage of being inexpensive parts having a very accurate (tight toleranced) radius and a burr-free surface. The pivot pads 70, 72, and 94 may be sections or parts of ball bearings, with the ball bearings for example cut using an electro-discharge machining process, or another suitable process. The ball bearings may be made of suitable steel, such as 440C stainless steel. Such stainless steel has the advantage of a high microyield strength (the allowable stress that will cause 1 ppm of permanent strain in a short time, also known as precision elastic limit or PEL), which improves alignment stability in high shock environments.

Figure 6:
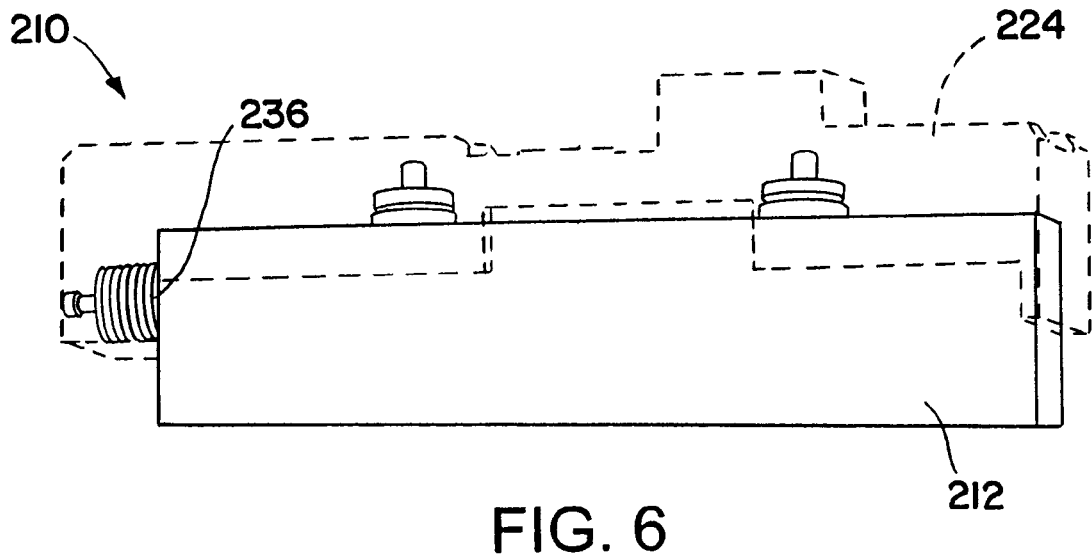
FIG. 6 is an oblique view showing a part of an optical mount according to another embodiment of the invention.
Figure 7:
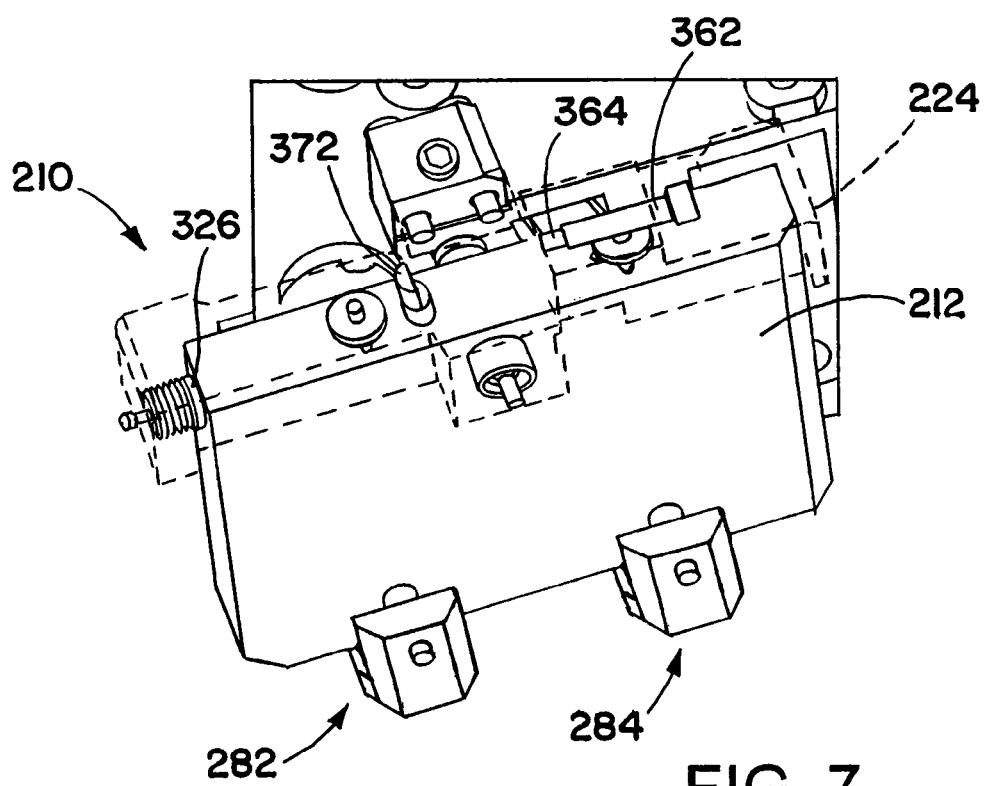
FIG. 7 is another oblique view of the optical mount of FIG. 6.
Figure 8:
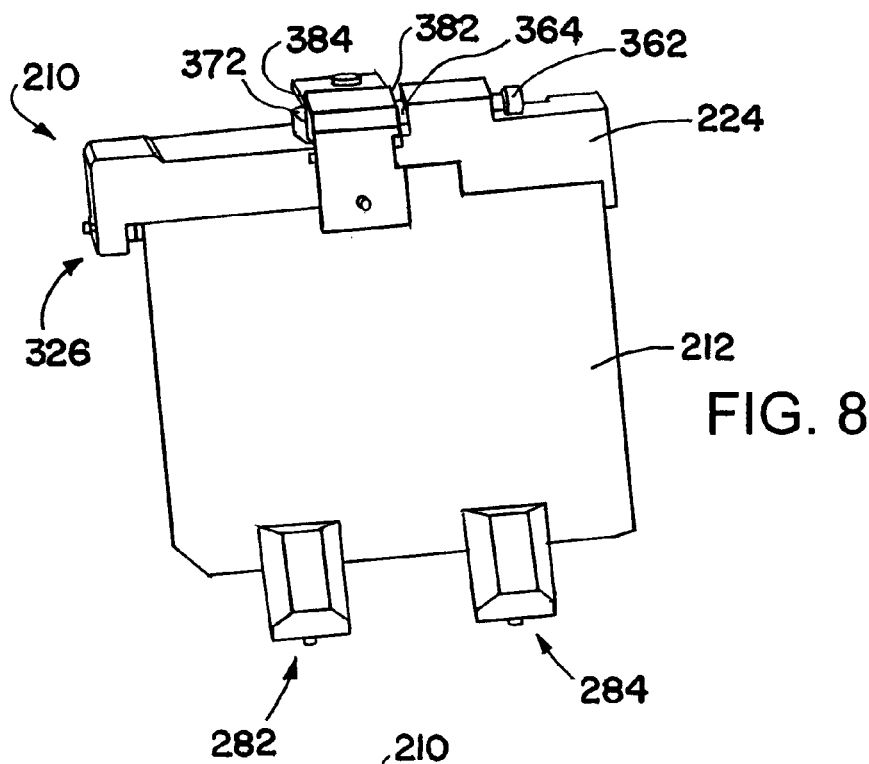
FIG. 8 is an oblique view of the optical mount of FIG. 6, showing the mount and optical element from a different angle.

FIGS. 6-8 show another embodiment, an optical mount 210 used for securing an optical element 212. In many respects the optical mount 210 is similar to the optical mount 10 (FIGS. 1-4), and some of the similar features of the two mounts 10 and 210 are omitted from the following discussion. Pads, such as the flat pads 282, 284, and 326, include plungers that are configured differently than the plunger 62 (FIG. 4) described above. The plungers of the pads 282, 284, and 326 have threaded outer ends. In order to keep the plungers in place during installation of the optical element 212 in the optical mount 210, small nuts (not shown) are threaded onto the threaded ends. These nuts provide a benefit beyond that of the snap ring 64 (FIG. 4), in that they also facilitate compressing the springs on the plungers to aid in assembly of the optical element 212 onto its support pads. After installation of the optical element 212 the nuts can be carefully backed off along the threaded plunger ends, for example by use of a suitable tool, and removed from the assembly, leaving the optical element 212 preloaded by the springs. If disassembly is ever required, the nuts can be threaded more fully onto the threaded plunger ends, thus disengaging the plungers from the optical element 212, and allowing the optical element 212 to be removed without damage, while simultaneously captivating the springs and plungers to their retainer clamps.

Another difference from the optical mount 10 (FIGS. 1-4) is that the optical mount 210 also has a different mechanism for loading its whiffletree retainer 224. In place of the lock screw 162 (FIG. 2) and the lock ball 172 (FIG. 2), the optical mount 210 has a spring-loaded lock screw 362, a pivot pad 364, and a pivot pin 372. The lock screw 362 presses the pivot pad 364 against a side surface 382 on one side of the whiffletree retainer clamp 222. The pivot pin 372 has a flat surface that engages the opposite side surface 384 of the whiffletree retainer clamp 222. The pivot pin 372 is free to rotate to decouple the loading of the whiffletree retainer 224, to prevent bending and/or twisting when the pivot pad 364 is loaded by the lock screw 362. The side surface 384 is curved, as best shown in FIG. 8, with a cylindrical shape to further decouple moments at the interface between the side surface 384 and the pivot pin 372.

Figure 9:
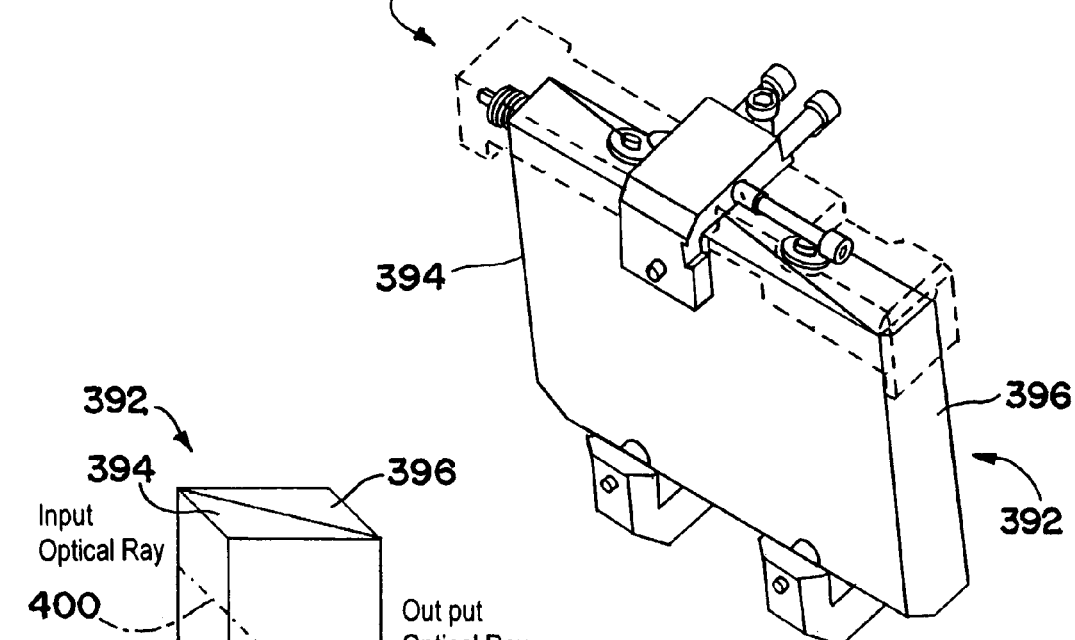
FIG. 9 is an oblique view showing the optical mount of FIG. 6 holding a two-part optical device.
Figure 10:
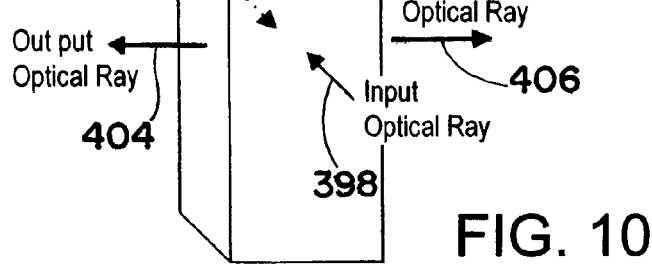
FIG. 10 is a schematic view of the two-part optical device of FIG. 9, illustrating entry and exit of light rays.

FIG. 9 shows the optical mount 210 being used to secure an optical device 392 that includes two different optics 394 and 396 that are joined together, such as by gluing. Incoming light 398 and 400 enters the optics 394 and 396, respectively, and never crosses the interface between the optics, as shown on FIG. 10. In FIG. 10 the incoming light 398 results in output light 404, and the incoming light 400 produces the output light 406. One use for the optical mount 210 in such an arrangement is to change the angle of the input/output rays by adjusting the position of the optical device 392, using the optical mount 210. The utilization of a whiffletree retainer and support clamp design facilitates fully exposing four orthogonal surfaces of the optic, versus only the two parallel surfaces available with standard mount frames that circumscribe the optic.

Figure 11:
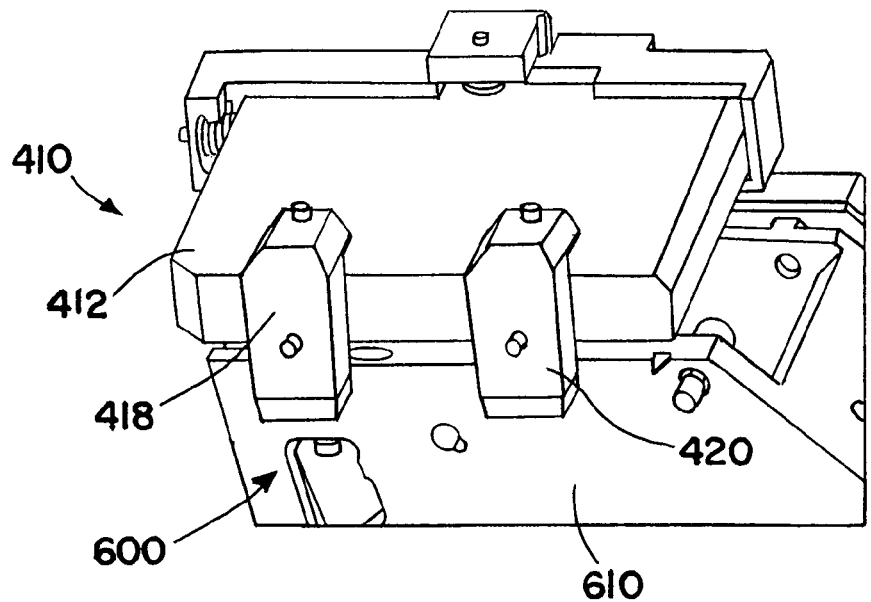
FIG. 11 is an oblique view of an optical mount according to yet another alternate embodiment of invention.
Figure 12:
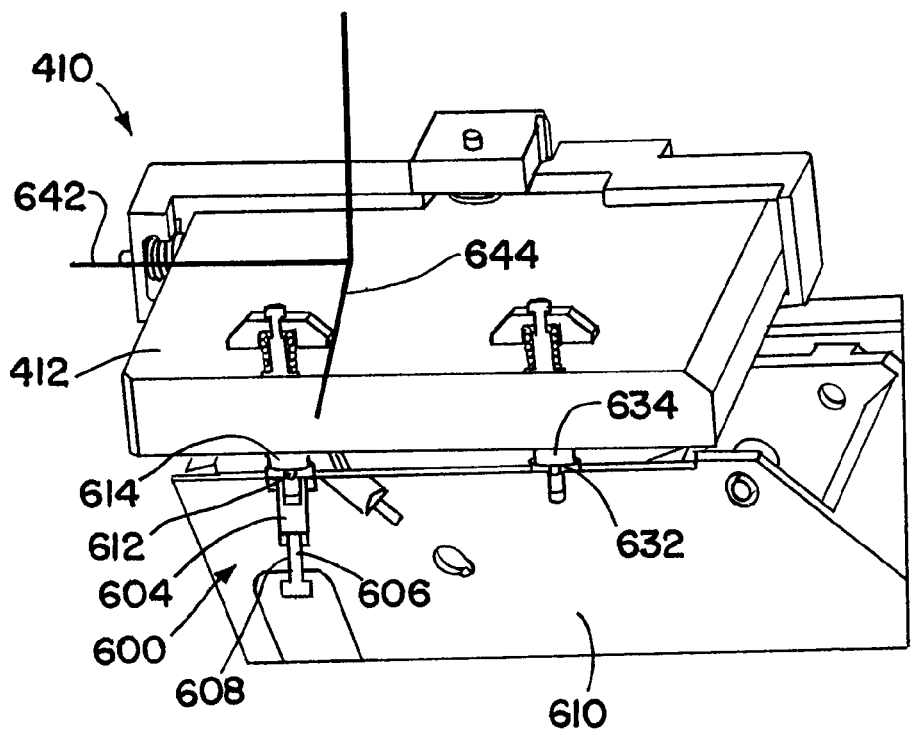
FIG. 12 is a sectional view of the optical mount of FIG. 11.

FIGS. 11 and 12 show another variant, an optical mount 410 for holding an optical device 412. The optical mount 410 is a variant of the optical mount 210 (FIG. 6), and some common features of the mounts 210 and 410 are omitted in the following discussion. The optical mounts 10 and 210 (FIGS. 1 and 6, respectively) allow adjustment in only an elevation axis. The optical mount 410, in contrast, allows an adjustment in another axis, in addition to elevation axis. This additional axis is referred to a "pseudo-azimuth" axis, in that it is not quite orthogonal to the elevation axis. When adjustment is made in this pseudo-azimuth axis, it also creates some elevation tilt, because motions in these two axes are coupled together.

In addition to the adjustment mechanism for adjustment of elevation, described earlier with regard to the mounts 10 and 210, the mount 410 has a pseudo-azimuth adjustment mechanism 600. The adjustment mechanism 600 includes a spring-loaded plunger 604 that has a threaded shaft 606 that engages a threaded hole 608 in a housing 610. The plunger 604 can be turned to adjust the vertical position of a cup 612 and a pad 614 above the housing 610. A retainer clamp 418 is secured to the housing 610 by the cup 612 and the pad 614, with the height of the retainer clamp 418 adjustable as described above. Another retainer clamp 420 is coupled to the housing 610 by an additional cup 632 and pad 634, allowing the retainer clamp 420 to pivot relative to the housing 610 as the height of the retainer clamp 418 is adjusted.

The elevation adjustment is performed about an elevation axis 642, and the pseudo-azimuth adjustment is performed about an axis 644. Several alignment iterations may need to be performed to align the optical device 412, alternatively between elevation adjustment and pseudo-azimuth adjustment.

The optical mounts described herein may be used in any of a variety of devices, for example as part of sensor systems in air vehicles, such as unmanned aerial vehicles. The mounts may be used to secure a variety of other sorts of precise devices in highly dynamic thermal and inertial environments that may need to be securely held and precisely positioned, without placing undue stress on the device being held.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An optical mount comprising:
   a housing;
   a pair of optical element retainer clamps mechanically coupled to the housing, wherein the optical element retainer clamps are configured to receive and secure a first side of an optical element at respective first securement points on a major surface of the optical element, adjacent to a first edge of the optical element that is along the first side;
   a whiffletree retainer clamp mechanically coupled to the housing, wherein the optical element retainer clamps are configured to receive and secure a second side of an optical element at a pair of second securement points on the major surface; and
   a whiffletree retainer that is configured to press against at least two points along a second edge of the optical element that is along the second side;
   wherein the whiffletree retainer clamp mechanically couples the whiffletree retainer to the housing; and
   wherein the whiffletree retainer is positionally adjustable relative to the optical element retainer clamps and the whiffletree retainer clamp.

2. The optical mount of claim 1,
   wherein the major surface is a first major surface; and
   further comprising pivot pads that are mechanically coupled to the housing that press against a second major surface of the optical element;
   wherein the pivot pads allow the optical element and the whiffletree retainer to pivot relative to the housing, the retainer clamps, and the whiffletree retainer clamp.

3. The optical mount of claim 2, wherein the pivot pads have flat front surfaces that press against the second major surface, and curved back surfaces that engage pivot pad supports that are coupled to the housing.

4. The optical mount of claim 3, wherein the pivot pads are sections of one or more ball bearings.

5. The optical mount of claim 3, wherein the pivot pads are made of steel.

6. The optical mount of claim 3, wherein the pivot pads are made of stainless steel.

7. The optical mount of claim 3, wherein one of the pivot pad supports is an adjustable pivot pad support, able to adjust a height of a corresponding of the pivot pads above the housing.

8. The optical mount of claim 7, further comprising a pivot pad support locking mechanism that is operatively coupled to the adjustable pivot pad support, to lock the adjustable pivot pad in place.

9. The optical mount of claim 8, wherein the pivot pad support locking mechanism includes a locking screw that is threaded into a hole in the housing to engage the adjustable pivot pad, to lock the adjustable pivot pad in place.

10. The optical mount of claim 1, wherein the whiffletree retainer has a curved surface in contact with a surface of the whiffletree retainer clamp, allowing the whiffletree retainer and the optical element to pivot relative to other parts of the optical mount.

11. The optical mount of claim 1, wherein the whiffletree retainer and the optical can pivot in multiple axes relative to other parts of the optical mount.

12. The optical mount of claim 1, wherein the whiffletree retainer is also configured to engage third and fourth side edges of the optical element.

13. The optical mount of claim 1, further comprising a whiffletree retainer locking mechanism for securing whiffletree retainer to whiffletree retainer clamp.

14. The optical mount of claim 13,
    wherein the whiffletree retainer locking mechanism includes lock screw and a lock ball; and
    wherein the lock ball is threaded into a hole in the whiffletree retainer clamp to press the lock ball against a surface of the whiffletree retainer.

15. The optical mount of claim 1,
    wherein the optical element retainer clamps and the whiffletree retainer each have flat pads that are configured to engage and press against the edges of the optical element; and
    wherein each of the flat pads includes a plunger and a spring, with the spring used to provide a spring force to push the plunger against one of the edges of the optical element.

16. The optical mount of claim 1, wherein the whiffletree retainer clamp is made of steel, and the retainer clamps, whiffletree retainer, and the housings are made of aluminum.

17. The optical mount of claim 1, combination with the optical element.

18. The combination of claim 17, wherein the optical element is a beam splitter.

19. A method of securing an optical element, the method comprising:
    placing the optical element in a whiffletree retainer of an optical mount; and
    securing the optical element in three places, by use of coaxial pairs of pads of the mount pressing on opposite major surfaces of the optical element.

20. The method of claim 19,
    wherein the pads include pivot pads; and
    further comprising pivoting the optical element and the whiffletree retainer relative to other parts of the optical mount.

* * * * *